2 Sheets—Sheet 2.
A. W. SMITH.
GAS METER.
No. 75,653.          Patented Mar. 17, 1868.
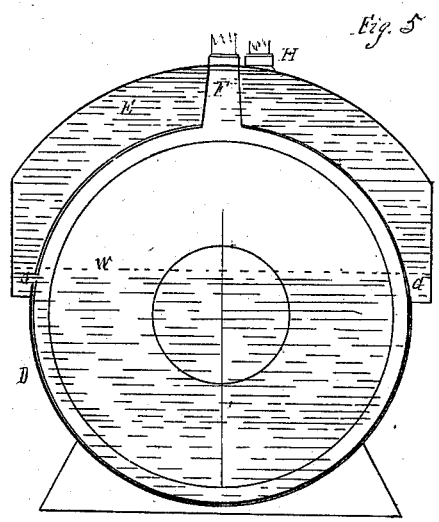
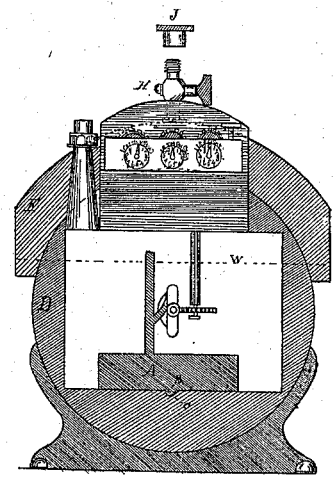
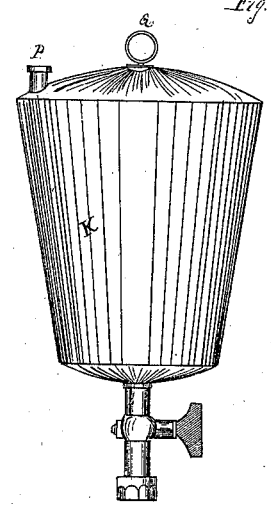
Witnesses
Sam'l H. Baird
James Patton Jr
Inventor
Anthony W. Smith

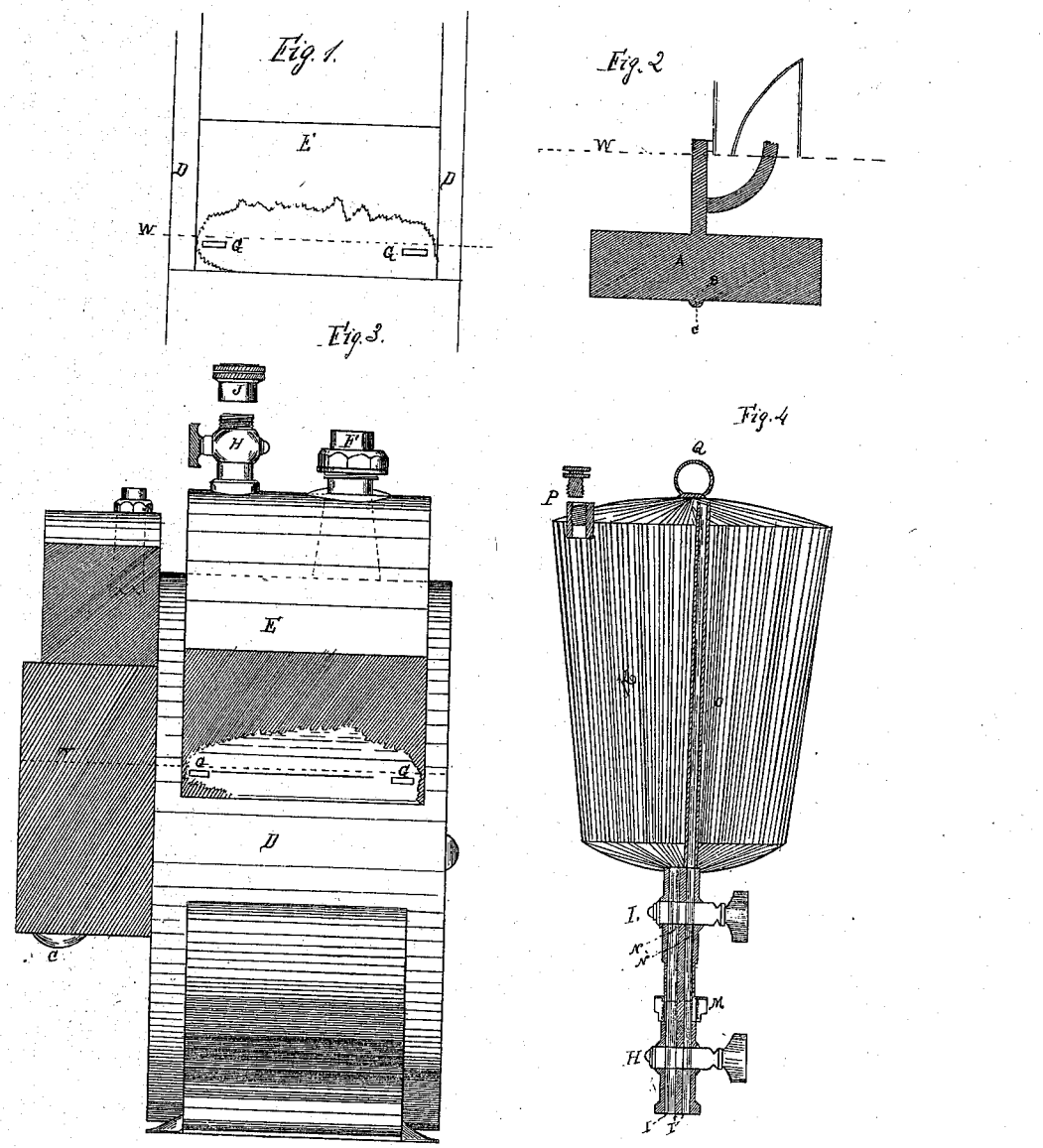

United States Patent Office.

ANTHONY W. SMITH, OF BIRMINGHAM, PENNSYLVANIA.

Letters Patent No. 75,653, dated March 17, 1868.

IMPROVEMENT IN GAS-METERS.

*The Schedule referred to in these Letters Patent and making part of the same.*

TO ALL WHOM IT MAY CONCERN:

Be it known that I, ANTHONY W. SMITH, of Birmingham, in the county of Allegheny, in the State of Pennsylvania, have invented or discovered certain new and valuable Improvements in the Construction of Gas-Meters; and I do hereby declare that the following is a full and exact description thereof, reference being had to the accompanying drawings, and to the letters and figures of reference marked thereon, like parts in each drawing being indicated by like letters—

Figure 1 being view of left side, showing reservoir and passages.
Figure 2 being view of condensing-well and connections.
Figure 3 being full view of right-hand side of meter, with passages exposed.
Figure 4 being sectional view of "filler" and stop-cocks, jointed.
Figure 5 being sectional view of drum, case, and reservoir.
Figure 6 being front view of meter.
Figure 7 being perspective view of "filler."

The class of gas-meters to which my invention relates and my improvements are applicable is that generally known to the public as the (consumer's) wet meter; and to show the nature of my invention more fully, I shall describe briefly the defects of those as now constructed. The essential object to be accomplished and maintained in the construction and use of the wet meter being the keeping of the liquid at a certain height or level in the case, should the liquid sink below this level, more gas will pass through than registered, and should it be filled above the level, less gas will be consumed than registered. For the consumer to effect fraud, it is only required to withdraw part of the water from the meter, by the medium of any of the screw-plugs found at the front side, and he will get more gas than is registered against him, or, by inclining the meter in various ways, he can accomplish the same purpose; by one way enabling him to get a full stream without the drum revolving once. Evaporation of the liquid is also a great source of incorrectness of the meter. Neglect of the gas-company employees to fill it and properly attend to it, is also the cause of annoyance and fraud; so that it has become a subject of legislation to provide against the faults of the meters as now used.

The nature of my invention consists in providing the outside case of the meter with a reservoir, resting on and attached to the top of it, above the water-level, so constructed, with four passages through the outside case aforesaid, situated at or near the four corners of the water-level, connecting the water in the case with the water in the reservoir, that any change in the height or level of the water, either from evaporation, disturbance, or any other cause, will unseal either one or all of these passages, when the water will come down from the reservoir until the passages are sealed. The reservoir is made with an air-tight cock, opening into the top of it, to which a filler or trap is to be attached for the purpose of filling it with liquid whenever the supply becomes exhausted.

This invention also does away with the use of the usual attachments, such as valve and valve-chamber, float, the screw-plug connecting with the condensing-well, the screw-plug at the side, at the water-level, and the one also by which the meter is filled with the liquid. Also the construction of the condensing-well, of sufficiently great capacity to hold the condensation for a number of years, with an opening into it from the bottom of the front oblong chamber, which opening is covered by a cap, soldered on, in order that communication to the well can only be made by the gas company when the meter is removed from its place, and does not afford any opportunity to the consumer of drawing off the water, as has been done, through the screw-plug.

By these improvements and arrangements of parts, a meter can be constructed, which, when placed correctly in position, will preserve the water-level or height always at the same point, and does not afford any opportunity to the consumer to tamper with it, except to his own injury or detection of the attempt, thus making a correct register, in use.

To enable those skilled in the art to make and use my invention, I will proceed to describe its construction and operation.

I construct my gas-meter in any of the known original forms, i. e., with outside cylinder-case, with drum revolving inside, exit-pipe and entry-pipe, and the oblong front case, in which the worm-wheel, the shaft, machinery, and dials, are usually located, with this change, that the entry-pipe connects directly with this chamber or front case, the valve-chamber and float not being used. The condensing-well A, I enlarge as much as may be required to contain the accumulation of condensed gas and impurities for a number of years. The bottom of this well I connect with the outside of the meter by a passage or punch-hole, B, over which is soldered the cap C; this taking the place of the usual screw-plug at that point. I also abolish, or do not use, the usual screw-plug opening at the top of the front case, by which the meter is filled, nor the water-level screw-plug opening, on the side of the front case. On the top of the outside case D, I construct a reservoir, E, of any suitable shape, soldered securely to the case D, fitting over the whole top of the case, and down about one-half inch below the water-level, and embracing also the exit-pipe F. Through the outside case D, about one-tenth of an inch below the water-level W, and near each corner of the reservoir, so as to bring them near the corners of the surface of the water in the case D, I make or insert an oblong hole or passage, G G G G, connecting the reservoir and the water in the outside case D. These passages can be made of any size. I find on experiment that one-half inch long and one-quarter inch broad answers the purpose very well. The one-tenth inch from the level line is to provide for the variation of the water, caused by the pressure, changing in different parts, as the gas passes through the drum. Upon the top of the reservoir I attach an air-tight stop-cock, H, made with two bores, I I', separate and distinct, operating, opening, and closing together by the same key. On the outside of the top of this cock, I make screw-thread, on which to fit the cap J. I also make a vessel, K, which I shall call a "filler," made in this manner, of any convenient form; it has a stop-cock, L, with the bores N N', made exactly similar to the stop-cock H, and in addition is the swivel-attachment, M, to joint the stop-cocks H and L. Prolonging the bore N' is the tube O, which passes up to the cap of the filler, almost touching it. On the top and to one side of the "filler," I make a screw-plug and screw, P, the tube running into the "filler" below the top of the tube O. Q is the handle, by which the "filler" had best be carried. And be it understood here that while I mention only four passages, G G G G, in my claims, and think that they will answer the purpose better than a less number, and as well as a greater number, yet I do not wish to be restricted to the use of only that number to accomplish the purpose.

The operation of this meter is in this wise: In placing the meter in position, it should be placed perfectly level. The "filler" K is attached by the swivel M to the cock H. The cocks being closed, the "filler" is filled through the tube P; the plug is then placed in the tube P, and the two cocks H and L are opened. The water is thus trapped down through the tubes I and N, making now one continuous tube, and the air or gas is trapped up into the "filler" by the tubes I' and N' and O, now making also one continuous tube. After the filler is exhausted the stop-cocks are again closed, and the filler replenished and exhausted again, as described, until the meter is filled up to the water-level, and the reservoir is completely filled, when no more liquid will flow from the "filler." The stop-cocks are again closed, and the filler detached from the meter, answering the same purpose in connection with another meter, and the screw-cap J is screwed on the cock H, in order to keep dust from the tubes or bores, and to answer as safety-guards against the accidental opening of the cock.

It will be observed that all liquid entering the reservoir E, after the level has reached the upper edge of the passages G G G G, will be sustained by the pressure on the surface of the liquid in the case D, and that whenever the level by any cause gets below the said edges, the liquid will fall from the reservoir, and its place be filled with gas, until the said passages are sealed by the rising of the liquid.

By making the reservoir of sufficient capacity, the meter need not be refilled for some years, and by the enlargement of the condensing-well, that need be emptied only when the usual repairs are made.

Now, what I claim as my invention, and desire to secure by Letters Patent of the United States, is—

1. The construction of the wet gas-meter, with the reservoir E, the passages G G G G, the double stop-cock H, with the bores I I', and the cap J, all arranged for the purpose and in the manner substantially as set forth and described.

2. The manner of constructing the condensing-well A, the passage B, and the cap C, all arranged for the purpose substantially as set forth and described.

3. The "filler" K, constructed with the double stop-cock L, with the bores N N', the extension-tube O, the swivel M, the screw-tube and plug P, and the handle Q, all arranged and operating in the manner and for the purposes substantially as set forth and described.

ANTHONY W. SMITH.

Witnesses:
SAML. H. BAIRD,
JAMES PATTON, Jr.